3,634,488
PROCESS FOR PRODUCING CYANOACETYLENE
Katsura Morita, Ikeda, Osaka, Naoto Hashimoto, Suita, Osaka, Shiro Morimoto, Kobe, Yasuo Ando, Nishinomiya, and Yutaka Miyashiro, Nara, Japan, assignors to Takeda Chemical Industries, Ltd., Osaka, Japan
No Drawing. Filed Aug. 12, 1969, Ser. No. 849,504
Claims priority, application Japan, Aug. 20, 1968, 43/59,456
Int. Cl. C07c *121/30*
U.S. Cl. 260—465.9          3 Claims

ABSTRACT OF THE DISCLOSURE

Cyanoacetylene is produced by the gas phase reaction of acrylonitrile and chlorine, at 500° to 1,200° C.

---

This invention relates to a process for producing cyanoacetylene. More particularly, this invention relates to a process for producing cyanoacetylene, which comprises subjecting gasified acrylonitrile and chlorine to a gas-phase reaction at an elevated temperature.

Owing to its remarkable reactivity, cyanoacetylene, $HC \equiv C - C \equiv N$ is useful as an intermediate in the preparation of synthetic polymers, 3-amino-isoxazoles, and various nitrogen-containing compounds including purine bases, pyrimidine bases, etc.

We previously developed a process for producing cyanoacetylene wherein acrylonitrile is first reacted with chlorine in liquid phase in the presence of a catalyst and the resulting $\alpha,\beta$-dichloropropionitrile, or a monochloroacrylonitrile obtained by removal of a molecule of hydrogenchloride from $\alpha,\beta$-dichloropropionitile is then subjected to a gas-phase reaction.

Although the process is excellent in a yield and is of practical value, it has still following disadvantages:

(1) The intermediates, e.g. $\alpha,\beta$-dichloropropionitrile and monochloroacrylonitrile, are inflammatory;

(2) Since the production of the intermediates is carried out in the presence of pyridine, it is necessary to remove pyridine after the reaction; and (3) The process consists of two steps and as a result, requires many hours.

In an attempt to make a further development of the process, we have found that if gasified acrylonitrile and chlorine are subjected to a gas-phase reaction at an elevated temperature, cyanoacetylene is directly produced in one step and in a better yield.

This invention is the culmination of the above findings.

The main object of this invention is to provide a novel industrially feasible process for producing cyanoacetylene in a high yield. The gas-phase reaction of the present invention can be carried out by feeding gasified acrylonitrile and chlorine in a pre-adjusted molar ratio into a reactor which has been heated to a pre-determined temperature by an electric furnace or other suitable means.

The molar ratio of chlorine to acrylonitrile may vary with the reaction conditions in a wide range (e.g. from 0.1 to 10). In general, however, it is advantageous to select an optimal ratio within the range of 0.3 to 3.

While chlorine is gaseous at room temperature (about 20° to 30° C.), acrylonitrile is liquid, and easily vaporized by heating at about 80° C. even at atmospheric pressure.

Both starting materials are readily available in commercial quantities and in this regard this invention also provides a profitable process for the production of cyanoacetylene.

The reaction is carried out under atmospheric pressure, but operation at a reduced pressure of e.g. about 10 to 100 mm. Hg is optimal.

The optimal reaction temperature varies with the pressure, but usually it is in the range between about 500 and about 1,200° C., and advantageously between about 700 and about 1,100° C.

The reactor, a tubular type is desirable, may be made of any material insofar as it can resist the high reaction temperature. The reactor is placed in a horizontal or vertical furnace kept at a desired temperature throughout the reaction. It is possible to stuff the reactor with a proper catalyst such as magnesium chloride, barium chloride or any other additives, or if desired, to conduct the reaction in the presence of an inert gas such as nitrogen gas, carbon dioxide, are gases, and the like.

The process of the present invention is simplified and the reaction proceeds rapidly in a gas-phase, resulting in less formation of by-products (e.g. $\alpha$-chloroacrylonitrile, $\beta$-chloroacrylonitrile).

Thus, the reaction can be continued for many hours without stopping.

The resulting crude cyanoacetylene can be recoverd by applying per se conventional procedures such as sublimation or distillation to give refined cyanoacetylene melting at 5° C. and boiling at 42° C., these constants being in good accord with the recorded values in literature references concerned.

On the other hand, the by-products mentioned above can also be used as the starting materials for the present invention. Thus, they are recovered together with the unreacted acrylonitrile and mixed with fresh acrylonitrile to employ as starting materials.

The following examples are merely for illustartive purposes and not to be construed as limitation of the present invention.

The relationship between parts by weight and parts by volume is the same as that between grams and mililiters.

In the examples, percentages are calculated on the molar basis of the starting acrylonitrile.

EXAMPLE 1

A tubular quartz reactor (its capacity being 200 parts by volume) is used, one end of which is connected with a vacuum distillation vessel into which an inlet for gaseous chlorine and acrylonitrile are fed and the other end of which is connected with a vacuum pump through a series of collectors cooled by ethanol-Dry Ice and a self-adjusting vacuum manometer. The quartz reactor is heated by an electric furnace at 1,050° C., and the whole system is maintained at a pressure of 15 mm. Hg. Acrylonitrile and chlorine are fed to the reactor at the feed rates of 580 parts by weight/hr. and 1,090 parts by weight/hr., respectively.

The reaction is carried out for 1 hour, and the resulting product is distilled to give 48.1 parts by weight of cyanoacetylene boiling at 42° to 45° C.

The yield was 47.2% based on the used acrylonitrile.

EXAMPLES 2 TO 7

The same reactor as in Example 1 is employed and the reaction is carried out under a pressure of 15 mm. Hg at certain conditions set forth in Table 1 for one hour.

| Example No. | Molar ratio, acrylonitrile/ chlorine | Reaction temperature (° C.) | Yield of cyanoacetylene (percent) |
|---|---|---|---|
| 2 | 1/3.65 | 1,050 | *21.9 |
| 3 | 1/0.26 | 1,000 | 6.1 |
| 4 | 1/2.13 | 1,000 | 40.4 |
| 5 | 1/9.1 | 1,000 | 32.8 |
| 6 | 1/0.67 | 1,000 | 22.7 |
| 7 | 1/1.94 | 1,000 | 42.5 |

*17.3% of chlorocyanoacetylene is produced at the same time.

EXAMPLES 8 TO 13

The same reactor as in Examples 1 to 7 is employed and heated by a series of three furnaces. The reaction is carried out under a pressure of 16.5 to 20 mm. Hg at certain conditions set forth in Table 2 for 30 minutes.

The yields of cyanacetylene, $\alpha$-chloroacrylonitrile and trans- and cis-$\beta$-chloroacrylonitrile, relative to consumed acrylonitrile are also shown in Table 2.

TABLE 2

| Example No. | 8 | 9 | 10 | 11 | 12 | 13 |
|---|---|---|---|---|---|---|
| Reaction temperature, °C.: | | | | | | |
| Electric furnace I | 600 | 700 | 700 | 600 | 600 | 600 |
| Electric furnace II | 980–1,000 | 980 | 980–1,000 | 920 | 900 | 900 |
| Electric furnace III | 980–1,000 | 980 | 980–1,000 | 1,050 | 1,000 | 1,000 |
| Acrylonitrile/chlorine molar ratio | 1/0.24 | 1/0.24 | 1/1 | 1/1 | 1/1.5 | 1/2.0 |
| Product yield, percent: | | | | | | |
| Cyanoacetylene | 15.1 | 13.0 | 18.2 | 31.0 | 43.9 | 54.3 |
| $\alpha$-chloroacrylonitrile | 13.1 | 18.4 | 14.8 | 15.7 | 8.3 | 9.4 |
| trans-$\beta$-Chloroacrylonitrile | 2.6 | 2.9 | 2.1 | 3.0 | 0.8 | 0.6 |
| cis-$\beta$-Chloroacrylonitrile | 2.1 | 2.6 | 1.2 | 1.7 | | |

What is claimed is:

1. A process for producing cyanoacetylene which comprises subjecting acrylonitrile and chlorine to gas phase reaction at 500° to 1,200° C.

2. A process according to claim 1, wherein the said reaction is carried out at a temperature between 700° C. and 1,100° C.

3. A method according to claim 1, wherein the said reaction is carried out under a pressure of 10 to 100 mm. Hg.

References Cited

UNITED STATES PATENTS

| | | | |
|---|---|---|---|
| 3,312,729 | 4/1967 | Moore et al. | 260—465.7 |
| 3,493,600 | 2/1970 | Morita et al. | 260—465.9 |
| 3,497,548 | 2/1970 | Morita et al. | 260—465.7 |

JOSEPH P. BRUST, Primary Examiner

U.S. Cl. X.R.

260—465.7